J. J. HASKIN.
VEHICLE WHEEL.
APPLICATION FILED JUNE 9, 1920.

1,428,229. Patented Sept. 5, 1922.

INVENTOR.
Joseph J. Haskin
BY
ATTORNEY

Patented Sept. 5, 1922.

1,428,229

UNITED STATES PATENT OFFICE.

JOSEPH J. HASKIN, OF STOCKTON, CALIFORNIA.

VEHICLE WHEEL.

Application filed June 9, 1920. Serial No. 387,548.

*To all whom it may concern:*

Be it known that I, JOSEPH J. HASKIN, a citizen of the United States, residing at Stockton, county of San Joaquin, State of California, have invented certain new and useful Improvements in Vehicle Wheels; and I do declare the following to be a full, clear, and exact description of the same, reference being had to the accompanying drawings, and to the characters of reference marked thereon which form a part of this application.

This invention relates to improvements in vehicle wheels, the principal object being to produce a wheel which will have incorporated in its construction certain features which will impart to the wheel sufficient resiliency to enable it to readily absorb shocks and all vibration.

It is therefore particularly adapted for use on vehicles employing either steel or solid-rubber tires, which having very little elasticity or resiliency, transmit all shocks and vibration directly to the vehicle and to the loads carried thereon, not only making very unpleasant riding for the driver and others, but rendering the safe transportation of fragile articles a doubtful matter.

A further object is to so arrange the parts of the wheel that one member may be easily removed and replaced with a minimum of time and expense, should any breakage or wear necessitate this being done. The wheel is, of course also adapted to be used with pneumatic tires, and with these, as with other types of tires, the mileage obtained therefrom will be greatly increased.

A further object of the invention is to produce a simple and inexpensive device and yet one which will be exceedingly effective for the purposes for which it is designed. These objects I accomplish by means of such structure and relative arrangement of parts as will fully appear by a perusal of the following specification and claims.

In the drawings similar characters of reference indicate corresponding parts in the several views.

Figure 1:
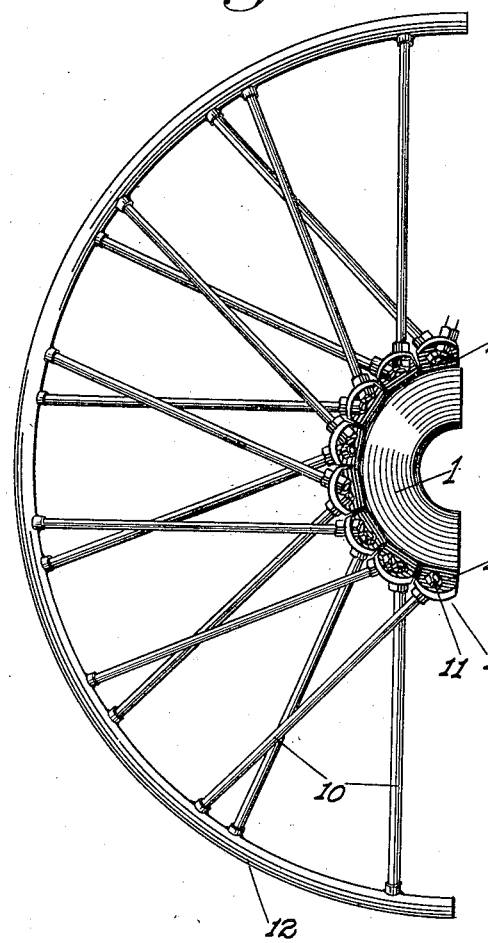
Fig. 1 is a half elevation of the wheel.
Figure 2:
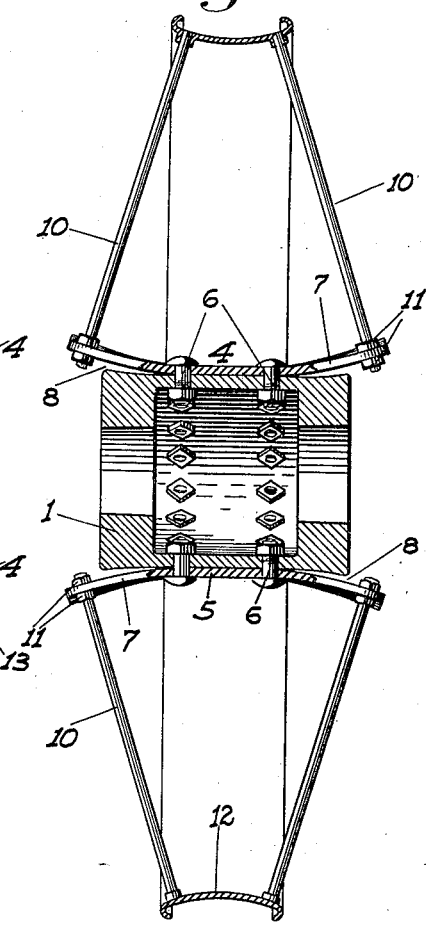
Fig. 2 is a cross section thereof.
Figure 3:
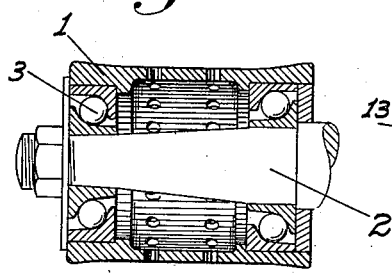
Fig. 3 is a view of the hub detached, showing it adapted to receive ball bearings for the axle.
Figure 4:
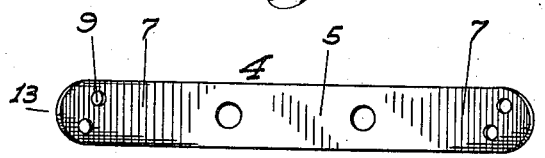
Fig. 4 is a detached plan view of a spring member.

Referring now more particularly to the character of references on the drawings, the numeral 1 denotes a hub arranged to receive an axle 2 therethrough which may be keyed to the hub to transmit power, or may be mounted on ball bearings 3 so that the hub will turn on the axle, as in front-wheel practice.

Arranged in close order about the hub, and extending lengthwise thereof and transversely of the wheel are the resilient members 4, made of spring steel.

These comprise a flat central portion 5 resting against the hub and secured thereto by bolts 6, the hub being flattened on its periphery for such portion, and end portions 7 preferably projecting beyond the ends of the hub, and bending outwardly away from the plane of the hub, so that there will be spaces 8 between such ends and the hub.

Each end of each member 4 is provided with a pair of offset holes 9 adapted to receive the ends of wire or similar spokes 10 therethrough, which are secured thereto by adjustable nuts 11, and extend to the corresponding edge of a rim 12, this rim being formed to receive a tire directly thereon, or to be connected to a demountable or other style rim, as may be found desirable.

Each pair of spokes connected to each end of the members 4 spread toward the rim to leave an angle of about 60° therebetween. To permit the nuts 11 resting squarely on the ends of the members 4, the latter are curved concavely relative to the hub, as shown at 13, so as to present a surface substantially at right angles to the line of the spokes.

Since each pair of spokes from each member 4 has a central angle therebetween of 60° or thereabouts, as stated, each spoke will be crossed at some points in its length by one or the other of the spokes from adjacent members 4. Thus a very rigid and substantial structure is had, while on account of the arrangement of the spokes, any shocks taken by a portion of the rim adjacent the ground is distributed through all the spokes in that area to a number of the members 4, instead of to only one, and thus the shocks and jars are widely disseminated, instead of being centralized.

From the foregoing description it will be readily seen that I have produced such a device as substantially fulfills the objects of the invention as set forth herein.

While this specification sets forth in detail the present and preferred construction of the device still in practice any deviations from such detail may be resorted to that do not form a departure from the spirit of the invention, as defined by the appended claims.

Having thus described my invention, what I claim as new and useful and desire to secure by Letters Patent is:—

1. A resilient wheel comprising a rim, a hub, a plurality of flat spring members secured to and arranged about the hub lengthwise thereof and spaced therefrom at the ends, and a pair of spokes from each of the outer ends of the spring members to the corresponding edges of the rim, the spokes from each end of each spring member spreading apart at an angle to each other and any spoke crossing two of the oppositely angled spokes from the two adjacent and successive ones of the spring members prior to its connection with the rim.

2. A resilient wheel comprising a rim, a hub, a plurality of flat spring members secured to and arranged about the hub lengthwise thereof and spaced therefrom at the ends, and a pair of spokes from each end of the spring member to the corresponding edges of the rim, said spokes spreading apart at an angle to each other and without crossing.

In testimony whereof I affix my signature.

JOSEPH J. HASKIN.